(12) United States Patent
Jeon et al.

(10) Patent No.: US 9,134,859 B2
(45) Date of Patent: Sep. 15, 2015

(54) TOUCH PANEL DISPLAY DEVICE (75) Inventors: Seongman Jeon, Seoul (KR); Sangcheon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 13/508,298

(22) PCT Filed: May 16, 2011

(86) PCT No.: PCT/KR2011/003595
§ 371 (c)(1),
(2), (4) Date: May 4, 2012

(87) PCT Pub. No.: WO2011/159028
PCT Pub. Date: Dec. 22, 2011

(65) Prior Publication Data
US 2012/0223905 A1    Sep. 6, 2012

(30) Foreign Application Priority Data
Jun. 14, 2010  (KR) .................. 10-2010-0055927

(51) Int. Cl.
G02F 1/1335  (2006.01)
G06F 3/033  (2013.01)
G06F 3/041  (2006.01)
G06F 3/042  (2006.01)
G06F 3/045  (2006.01)
G06F 3/044  (2006.01)

(52) U.S. Cl.
CPC ...................... *G06F 3/044* (2013.01)

(58) Field of Classification Search
USPC ..................... 349/12; 345/173–179
See application file for complete search history.

(56) References Cited

U.S. PATENT DOCUMENTS

| 6,020,945 | A  | * | 2/2000 | Sawai et al. | 349/119 |
|---|---|---|---|---|---|
| 6,411,344 | B2 | * | 6/2002 | Fujii et al. | 349/12 |
| 6,689,458 | B1 |   | 2/2004 | Mikoshiba et al. | |
| 7,405,779 | B2 | * | 7/2008 | Sanelle et al. | 349/96 |
| 8,125,463 | B2 | * | 2/2012 | Hotelling et al. | 345/173 |
| 2003/0170492 | A1 |  | 9/2003 | Anderson et al. | |
| 2009/0002580 | A1 | * | 1/2009 | Matsushima et al. | 349/12 |
| 2010/0214264 | A1 | * | 8/2010 | Kuo et al. | 345/174 |

FOREIGN PATENT DOCUMENTS

| JP | 2003-308736 A | 10/2003 |
|---|---|---|
| KR | 10-2006-0133331 A | 12/2006 |
| KR | 10-0727796 B1 | 6/2007 |
| KR | 10-2010-0043938 A | 4/2010 |

\* cited by examiner

*Primary Examiner* — Hoan C Nguyen
(74) *Attorney, Agent, or Firm* — Birch, Stewart, Kolasch & Birch, LLP (57) ABSTRACT

The present invention relates to a display device having a touch panel, and more particularly, to a touch panel display device which can improve visibility. The display device of the present invention includes: a display panel; a first film layer that is disposed on the display panel, and includes a first material, a first transparent layer having a first pattern disposed on the first material, and an index matching layer disposed between the first material and the first transparent layer; a second film layer that is disposed on the first film layer, and includes a second material, a second transparent layer having a second pattern disposed on the second material, and an index matching layer disposed between the second material and the second transparent layer; and a touch window disposed on the second film layer.

36 Claims, 10 Drawing Sheets

TOUCH PANEL DISPLAY DEVICE

TECHNICAL FIELD

The present invention relates to a display device having a touch panel, and more particularly, to a touch panel display device capable of achieving improved visibility.

BACKGROUND ART

Portable information processing devices such as laptop computers, portable transmission units, and cellular phones execute text and graphic processing using a variety of input devices, for example, keyboards, mouses, and digitizers.

There are limitations as to convenience in use of only keyboards or mouses as the input devices. Accordingly, such input devices have been developed so that everybody may easily input characters without false operation and a user may input characters while carrying the input devices.

Recently, there is interest in micro-technologies such as fabrication technologies related to processing and design providing high reliability, new functions, durability, and materials or substances, which go beyond levels satisfying need for general functions of the input devices.

Particularly, touch panels are utilized as the input devices so that everybody may easily input characters without false operation while carrying the input devices and a user may input characters without other input equipment.

DISCLOSURE

Technical Problem

An object of the present invention devised to solve the problem lies in a touch panel display device capable of achieving decrease of reflectivity and increase of transmittance in a portable device (for example, a cellular phone, a portable multimedia player (PMP), etc.) including a touch panel, thereby preventing visibility of a device screen from being deteriorated by sunlight or indoor light.

Technical Solution

To achieve these objects and other advantages and in accordance with the purpose of the invention, as embodied and broadly described herein, a touch panel display device includes a display panel, a first film layer located over the display panel, the first film layer including a first substrate, a first transparent conductive layer located over the first substrate and having a first pattern, and an index matching layer located between the first substrate and the first transparent conductive layer, a second film layer located over the first film layer, the second film layer including a second substrate, a second transparent conductive layer located over the second substrate and having a second pattern, and an index matching layer located between the second substrate and the second transparent conductive layer, and a touch window located over the second film layer, wherein the index matching layer allows at least one of reflectivity between the first substrate and the first transparent conductive layer and reflectivity between the second substrate and the second transparent conductive layer to be 1% or less.

In another aspect of the present invention, a touch panel display device includes a display panel, a first film layer located over the display panel, the first film layer including a first substrate, a first transparent conductive layer located over the first substrate and having a first pattern, and an index matching layer located between the first substrate and the first transparent conductive layer, a second film layer located over the first film layer, the second film layer including a second substrate, a second transparent conductive layer located over the second substrate and having a second pattern, and an index matching layer located between the second substrate and the second transparent conductive layer, a touch window located over the second film layer, a first polarization conversion portion to convert light passing through the same into a first circularly polarized light state while being located between the first transparent conductive layer and the display panel, and a second polarization conversion portion to form light passing through the same in the form of a first circularly polarized light state while being located between the second transparent conductive layer and the touch window.

Advantageous Effects

The present invention has effects as follows.

In accordance with the configuration of a touch panel display device according to the present invention, reflectivity may be decreased and transmittance may be increased. Thus, when a touch screen is applied to a portable device such as a cellular phone or a portable multimedia player (PMP), reduction in power consumption and improved visibility may be effectively maximized.

That is, it may be possible to overcome inconvenience in use caused by deterioration of visibility of a screen of a cellular phone due to indoor light or sunlight during operation outdoors. Also, it may be possible to greatly improve power problems caused by limitations of battery capacity.

Furthermore, there are limitations as to battery capacity in a portable device. Also, power consumption is gradually increased as many functions such as a camera are recently realized in the portable device such as a cellular phone. However, it may be possible to greatly increase battery life in the above-mentioned cases.

DESCRIPTION OF DRAWINGS

The above and other objects, features and other advantages of the present invention will be more clearly understood from the following detailed description taken in conjunction with the accompanying drawings, in which.

BEST MODE

Hereinafter, the exemplary embodiments of the present invention will be described in detail with reference to the accompanying drawings.

Reference will now be made in detail to the exemplary embodiments of the present invention, examples of which are illustrated in the accompanying drawings. However, the present invention may be implemented in many different forms and should not be construed as limited to the embodiments set forth herein. Rather, the present invention may include modifications, variations, equivalents, and substitutions compliant with the spirit or scope of the present invention defined by the appended claims.

It will be understood that when an element such as a layer, area, or substrate is referred to as being "on" another element, it can be directly on the element, or one or more intervening elements may also be present.

Also, it will be understood that although terms such as "first" and "second" may be used herein to describe elements, components, areas, layers and/or regions, the elements, components, areas, layers and/or regions should not be limited by these terms.

Figure 1:
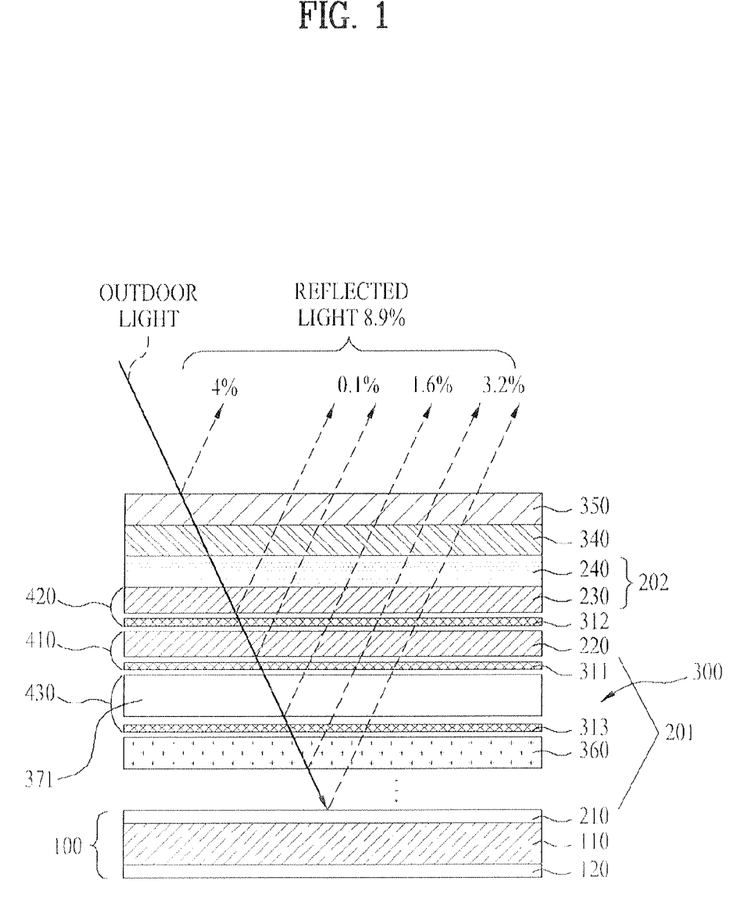
FIG. 1 is a sectional view illustrating a touch panel display device according to a first embodiment of the present invention.

As shown in FIG. 1, a touch panel display device according to the present embodiment may include a first film layer 410, a second film layer 420, and a touch window 350, which are disposed over a display panel 100.

The touch panel display device according to the present embodiment refers to a capacitive type touch panel display device, and may further include a third film layer 430 disposed between the display panel 100 and the first film layer 410.

The first, second, third film layers 410, 420, and 430 are constituted so that transparent conductive layers 311, 312, and 313 are respectively included in a first substrate 220, a second substrate 230, and a third substrate 371. The transparent conductive layers 311, 312, and 313 may be made of a transparent conductive oxide film such as indium tin oxide (ITO).

Here, among the transparent conductive layers 311, 312, and 313, the two transparent conductive layers 311 and 312 included in the respective first and second film layers 410 and 420 intersect with each other, and thus a grid pattern arranged in horizontal and vertical directions is formed.

That is, the transparent conductive layers may be comprised of a first transparent conductive layer 311 including a plurality of lines of a first axis (x axis) direction, which are parallel to one another, a second transparent conductive layer 312 including a plurality of lines of a second axis (y axis) direction, which are parallel to one another and are perpendicular to the first axis direction (the x and y axis directions may be changed with each other), and a third transparent conductive layer 313 which is located below the first transparent conductive layer 311 and serves as a ground.

In such a capacitive type touch panel display device, a touch may be sensed using capacitance coupling in a state in which alternating current voltage is applied, and a position may be sensed using the grid pattern of the first and second transparent conductive layers 311 and 312.

Meanwhile, a first polarization conversion portion 201 and a second polarization conversion portion 202 may be located over the display panel 100. The first polarization conversion portion 201 converts light emitted from the display panel 100 into a first polarized light state. Subsequently, the light is converted into a polarized light state equal to the first polarized light state while passing through the second polarization conversion portion 202.

The first polarization conversion portion 201 may convert light emitted from the display panel 100 into a first circularly polarized light. For example, the first polarization conversion portion 201 may convert light emitted from the display panel 100 into a right circularly polarized light state or a left circularly polarized light state.

The first polarization conversion portion 201, for example, may be comprised of a first linear polarization portion 210 included in the display panel 100 or located over the same, and a first ¼ wavelength plate 220 located over the first linear polarization portion 210.

Also, the second polarization conversion portion 202, for example, may be comprised of a second ¼ wavelength plate 230 located over the first polarization conversion portion 201, and a second linear polarization portion 240 located over the second ¼ wavelength plate 230.

That is, the present embodiment illustrates an example in which the first ¼ wavelength plate 220 is used as the first substrate of the first film layer 410, the second ¼ wavelength plate 230 is used as the second substrate of the second film layer 420, and an isotropic transparent film 371 is used as the third substrate of the third film layer 430.

Thus, the first and second ¼ wavelength plates 220 and 230 which form the respective first and second polarization conversion portions 201 and 202 may be used as substrates of the respective film layers, respectively. As occasion demands, the isotropic transparent film 371 may be used as a substrate.

For example, a liquid crystal display (LCD) panel 100 may be used as the display panel. The LCD panel 100 may include an upper polarization plate 210 located on a liquid crystal cell 110, and the upper polarization plate 210 may serve as the above-mentioned first linear polarization portion.

Of course, a Plasma display Panel (PDP), an organic light emitting diode (OLED) panel, or other various display panels, in addition to the LCD panel, may be used as the display panel 100. In this case, when the polarization plate is not included in the display panel, a separate first linear polarization portion may also be provided.

As occasion demands, a lower polarization plate 120 may be located at a lower side of the liquid crystal cell 110, and the liquid crystal cell 110 is supplied with light necessary for the display by a lower backlight unit.

Such a structure may be located over a board 360, and a transparent bonding layer 340 may be located in at least a portion of positions between each of these layers.

The structure located over the board 360 may be maintained to be spaced apart from the display panel 100 by a predetermined distance. Similarly to being described above, the LCD panel may be used as the display panel 100, and the LCD panel may have a configuration in which the first linear polarization portion 210 is integrally located on the liquid crystal cell 110, and the linear polarization portion 120 is provided at the lower side of the liquid crystal cell 110.

In the display device including a capacitive type touch panel portion 300, a ratio of outdoor light incident from the outside to reflected light is described as follows.

First, about 4% of the outdoor light may be reflected from the uppermost touch window 350. Subsequently, about 0.1% of the transmitted light may be reflected from each of the three transparent conductive layers 311, 312, and 313, so that the reflected light may be emitted to outside in an amount corresponding to, in total, 0.3% of the transmitted light.

In addition, about 1.6% of the further transmitted light is reflected from each of a lower surface of the board 360 and an upper surface of the display panel 100, so that the reflected light is generated in an amount corresponding to, in total, 3.2% of the further transmitted light.

First, about 4% of the outdoor light is reflected from the uppermost touch window 350, about 1.7% of the outdoor light is reflected from the three transparent conductive layers 311, 312, and 313, and about 3.2% of the outdoor light is reflected from the lower surface of the board 360 and the upper surface of the display panel 100.

Accordingly, in the present embodiment, the reflected light may be generated in an amount corresponding to, in total, 8.9% of the outdoor light. An amount of this reflected light is greatly decreased, compared with a case where the first and second polarization conversion portions 201 and 202 are not applied.

Meanwhile, at least one of the first, second, and third film layers 410, 420, and 430 may further include an index matching layer 411 between each of the substrates 220, 230, and 371 and each of the transparent conductive layers 311, 312, and 313.

Figure 2:
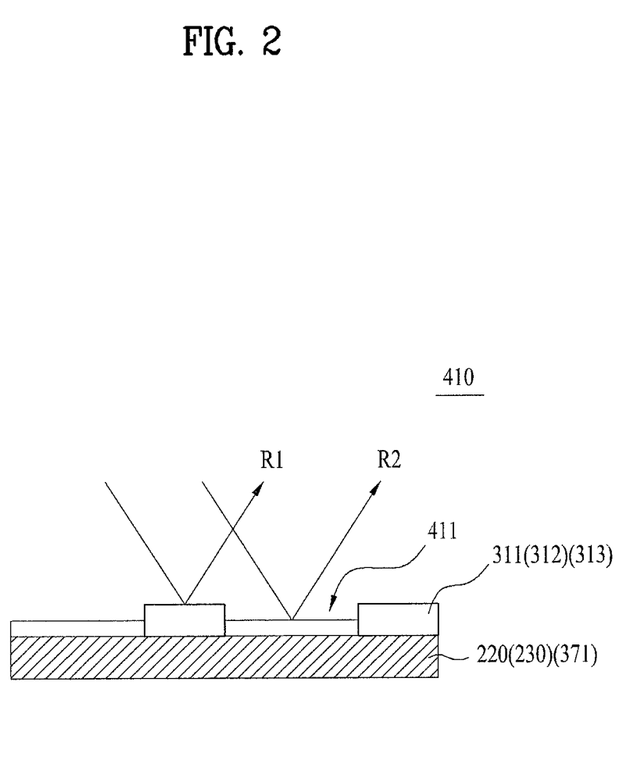
FIG. 2 is a view schematically illustrating reflection in a film layer.

FIG. 2 illustrates, for example, a detailed structure of the first film layer 410, wherein the index matching layer 411 is provided at an upper surface in which the transparent conductive layer 311 is not located.

In order to process signals input to the touch window 350 in the capacitive type touch panel display device, the first and second transparent conductive layers 311 and 312 intersect with each other in the first and second film layers 410 and 420, thereby forming a line pattern, as described above.

However, this pattern generates the difference in index of refraction between the respective transparent conductive layers 311 and 312 and the respective films coated on the substrates 220 and 230, thereby generating difference in reflectivity. The pattern may also be visible or invisible from the outside by the difference in reflectivity ($\Delta R=|R1\ R2|$).

In the display using a touch screen, if the pattern is visible, inconvenience in use and deterioration of image quality may be caused by interference generated on the screen.

When the difference in reflectivity between the respective transparent conductive layers 311 and 312 and the respective films coated on the substrates 220 and 230 is 1% or less, the pattern is invisible in the touch window 350.

Thus, in the case of the transparent conductive layer 311 of using as the ¼ wavelength plate 220, the index matching layer 411 may be provided to decrease the difference in reflectivity ($\Delta R=|R1\ R2|$) between the transparent conductive layer 311 and the substrate 220 to 1% or less, as described above.

Figure 3:
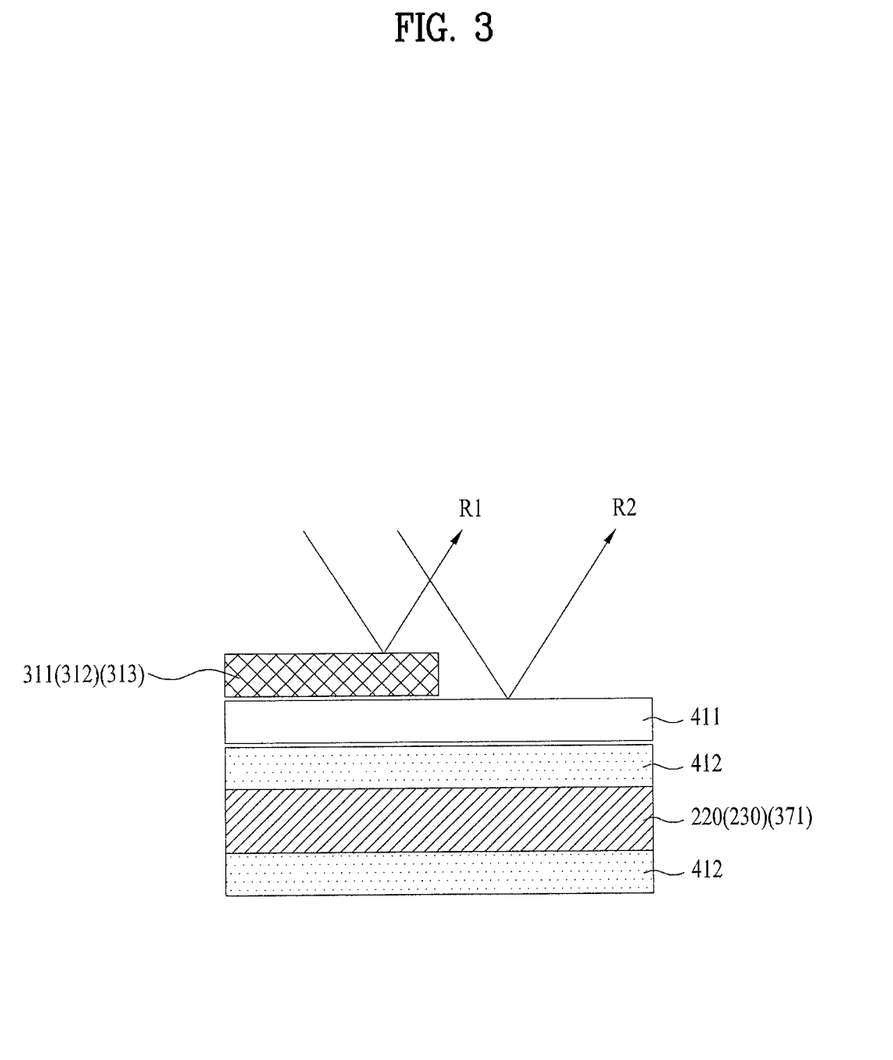
FIGS. 3 and 4 are sectional views illustrating the film layer in detail.

In this case, the ¼ wavelength plate 220 used as the substrate may be made of a TAC film or a cyclo olefin polymer (COP)-based material (transmittance: 92 to 91%). Since the ¼ wavelength plate 220 is made of a material having a pencil hardness of B to HB and is soft, a separate hard coating layer 412 may be required to reinforce durability of the touch window 350, as shown in FIG. 3.

The hard coating layer 412 may have a thickness of several μm (3 to 10 μm), and be applied with an acryl-based ultraviolet (UV) resin material (index of refraction n=1.40 to 1.53).

Since the difference in index of refraction between the hard coating layer 412 and the ITO film is 0.5 to 0.6, optical transmittance may be decreased to approximately 80%. Accordingly, in order to increase transmittance, the index matching layer 411 having a thickness of several dozen nm is provided over the hard coating layer 412 by a method such as coating.

The coating may be realized using a vacuum sputtering or slit die method. As shown in FIG. 3, the index matching layer 411 may be constituted as a single layer structure. In this case, index of refraction may reach 1.4 to 1.6.

Figure 4:
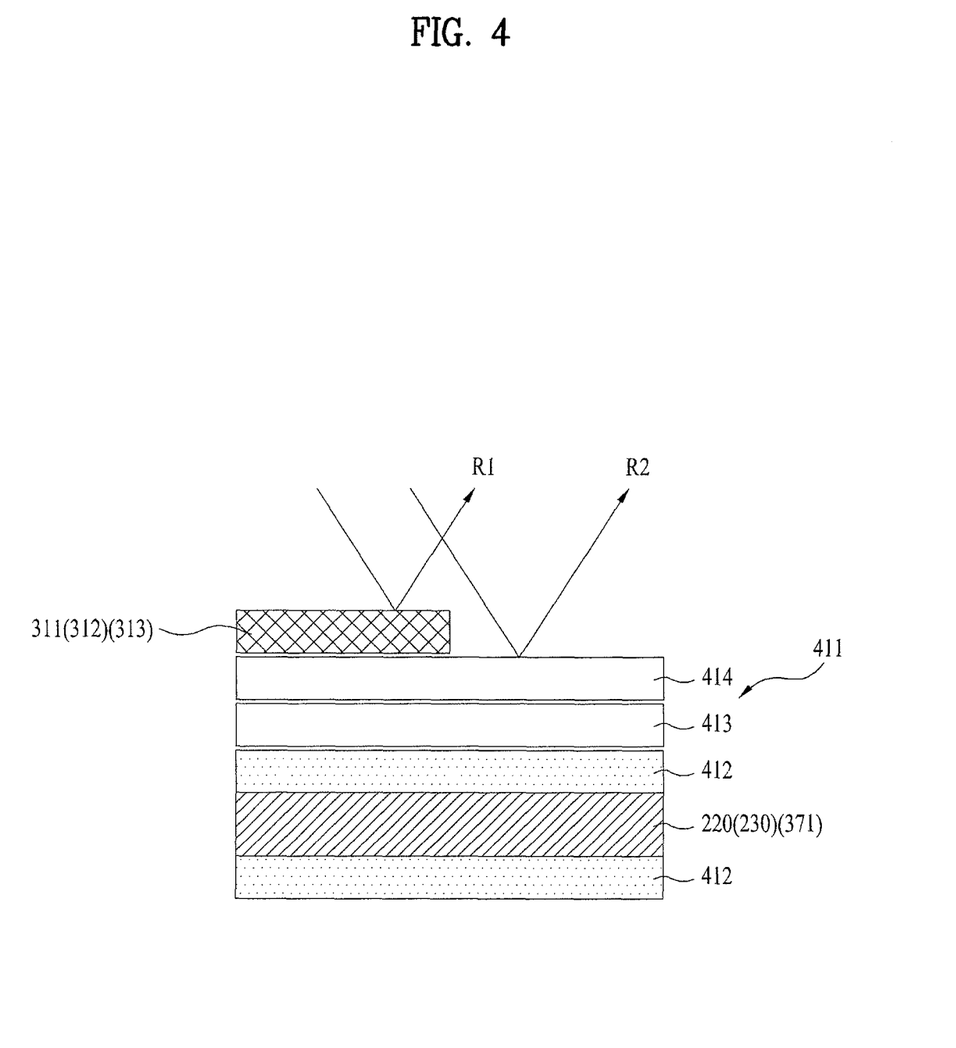

Meanwhile, a higher refractive layer 413 (index of refraction: about 1.95) and a lower refractive layer 414 (index of refraction: about 1.45) may be together used as the index matching layer 411, as shown in FIG. 4. In this case, it is preferable that index of refraction of the higher refractive layer 413 is 1.9 to 2.0, and index of refraction of the lower refractive layer 414 is 1.4 to 1.6.

Also, the higher refractive layer 413 and the lower refractive layer 414 may be alternately disposed in the form of two, four, or more layers (not shown).

The higher refractive layer 413 and the lower refractive layer 414 may obtain desired index of refraction by laminating various materials. For example, the higher refractive layer 413 may be made of a combination of three materials such as $TiO_x/ITO/In_2O_3$, whereas the lower refractive layer 414 may be made of a combination of two materials such as $SiO_x/SiO_2$.

In order to decrease the difference in reflectivity between the substrate and the associated transparent conductive layer to 1% or less, the index matching layer 411 may be constituted as a multilayer structure so as to attain great effects.

Meanwhile, at least a portion of the first and second polarization conversion portions 201 and 202 may be located over the board 360, the board 360 may be located to be spaced apart from the display panel 100 by a predetermined distance, and the board 360 and the display panel 100 may also be transparently attached to each other so as to have an integral structure.

The reflected light generated between the board 360 and the display panel 100 or by the touch window 350 and the remaining layers is absorbed without being emitted to the outside by operations of the above-mentioned first polarization conversion portion 201 and/or second polarization conversion portion 202, thereby being able to considerably decrease reflectivity. Such a process will be described with reference to FIGS. 5 and 6.

Figure 5:
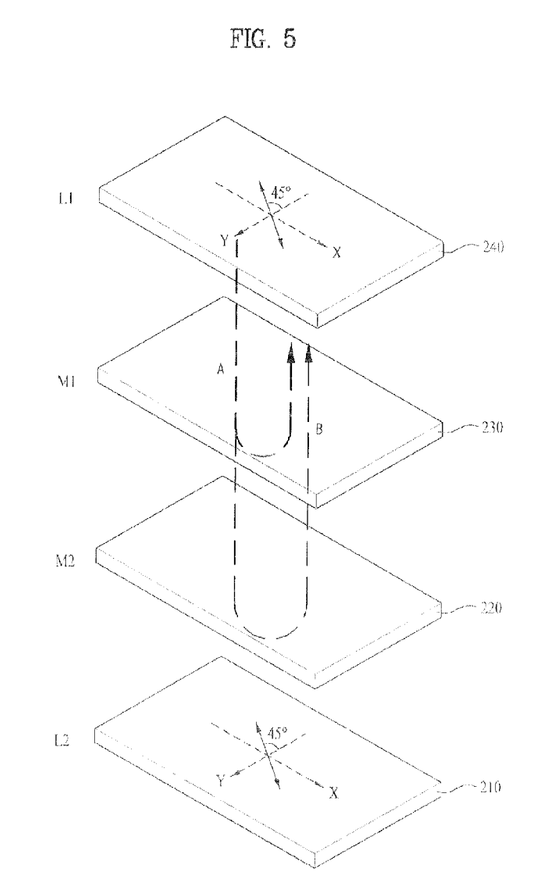
FIGS. 5 and 6 are schematic views for explanation of operations according to the first embodiment.
Figure 6:
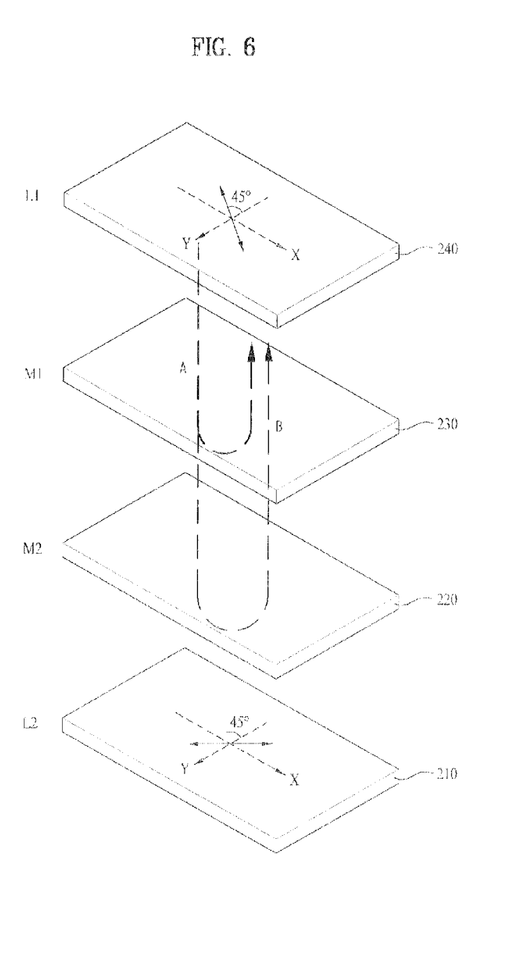

Light transmitting the upper second linear polarization portion 240 (L1) is linearly polarized, passes through the second ¼ wavelength plate 230 (M1), and is then converted into circularly polarized light of a clockwise direction (or counter clockwise direction). Subsequently, surface reflection is realized at each transparent conductive layer 311, 312, or 313.

In this case, the circularly polarized light of a clockwise direction (or counter clockwise direction) is converted into circularly polarized light of a counter clockwise direction (or clockwise direction) by the surface reflection. Thus, at least a portion of the light toward the outside by the reflection passes through the second ¼ wavelength plate 230 (M1), and is then converted into linear polarized light of a different direction. Subsequently, the linear polarized light is absorbed by the uppermost second linear polarization portion 240 (L1), and thus reflection of 0% is realized. That is, the reflection is not nearly realized.

Also, the following description will be given of a relationship between an optical axis of the upper second linear polarization portion 240 (L1) and an optical axis between the second ¼ wavelength plate 230 and the first ¼ wavelength plate 220, which are located at respective sides of the upper and lower transparent conductive layers 312 and 311 with reference to FIGS. 5 and 6.

When the LCD panel is used as the display panel 100, transmittance of light emitted from the panel 100 may be maximized by the following two cases, taking into consideration the first linear polarization portion 210 included in the panel 100.

That is, the light transmittance may be maximized by the configuration in which the first linear polarization portion 210 (L2) of the first polarization conversion portion 201 is parallel with the second linear polarization portion 240 (L1) of the second polarization conversion portion 202, as shown in FIG. 5, or the configuration in which the first linear polarization portion 210 (L2) is perpendicular to the second linear polarization portion 240 (L1), as shown in FIG. 6.

Thus, when the touch panel display device is comprised of the first polarization conversion portion 201 to convert light passing through the same into the first circularly polarized light sate and the second polarization conversion portion 202 to form light passing through the same in the form of the same first circularly polarized light while being located over the touch panel portion 300, the light emitted from the display panel 100 may be emitted to the outside while having a lower loss rate. That is, transmittance may be maximized.

Accordingly, the second polarization conversion portion 202 and the first ¼ wavelength plate 220 (M2) included in the first polarization conversion portion 201 may considerably decrease reflectivity of outdoor light.

In this case, since the second polarization conversion portion 202 serves to convert light passing through the same into circularly polarized light, it is preferable that the first polarization conversion portion 201 is also constituted to convert light passing through the same into circularly polarized light of the direction equal to the circularly polarized light as described in the second polarization conversion portion 202.

That is, since the first and second polarization conversion portions 201 and 202 have the same polarized light state, the light emitted from the display panel 100 may be emitted to the outside in a state of minimizing loss.

Hence, the first ¼ wavelength plate 220 of the first polarization conversion portion 201 may decrease reflectivity of outdoor light and improve transmittance of the light emitted from the display panel 100.

Figure 7:
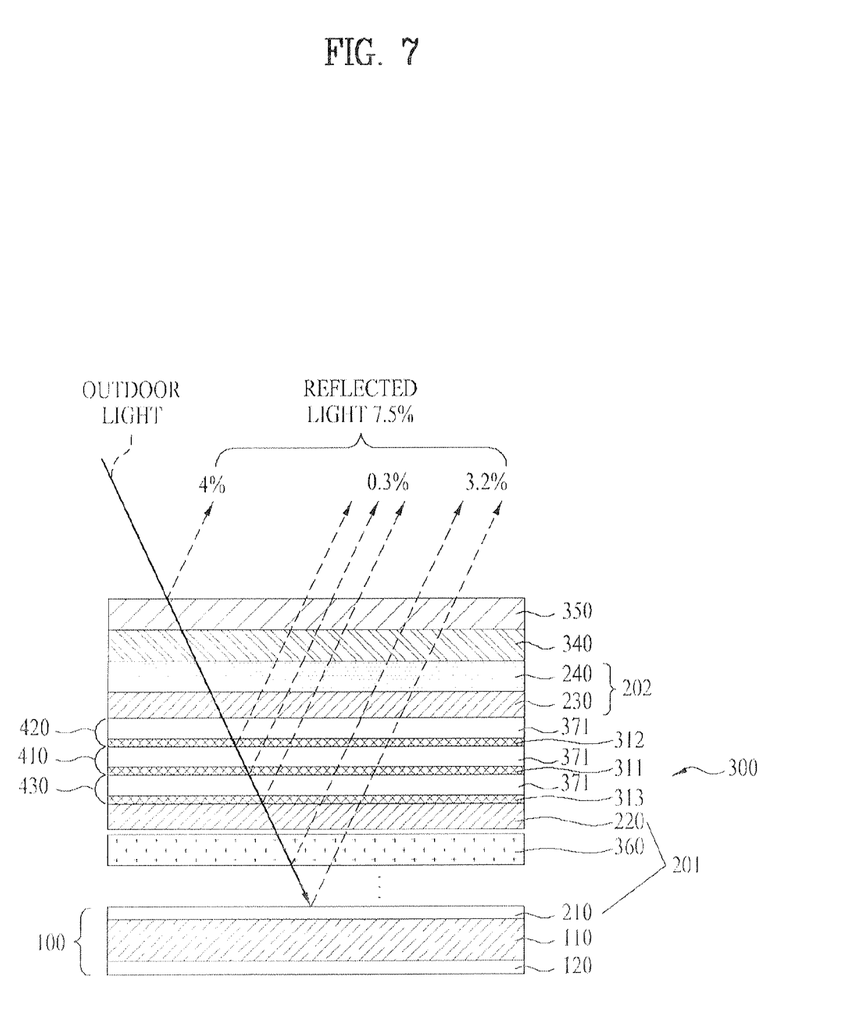
FIG. 7 is a sectional view illustrating a touch panel display device according to a second embodiment of the present invention.

FIG. 7 illustrates a touch panel display device constituted so that transparent conductive films 311, 312, 313 are respectively provided at isotropic transparent films 371 in respective film layers 410, 420, and 430 according to another embodiment. As described above, the two transparent conductive layers 311 and 312 included in the respective first and second film layers 410 and 420 are coupled to each other, and thus a grid pattern arranged in horizontal and vertical directions is formed.

As described above, a hard coating layer 412 (see FIGS. 3 and 4) and an index matching layer 411 (see FIGS. 2 to 4) may be applied to each of the film layers 410, 420, and 430. This specific example may be similar to the previous embodiment.

Similarly to the previous embodiment, the present embodiment has a configuration in which a first polarization conversion portion 201 and a second polarization conversion portion 202 are located over a display panel 100.

In this case, a cover film 350 may be located over a structure including the first and second polarization conversion portions 201 and 202. Such a structure may be located over a board 360, and a transparent bonding layer 340 may be located in at least a portion of positions between each of these layers.

The structure located over the board 360 may be maintained to be spaced apart from the display panel 100 by a predetermined distance. Similarly to the above-mentioned embodiment, a LCD panel may be used as the display panel 100, and the LCD panel may have a configuration in which a first linear polarization portion 210 is integrally located on a liquid crystal cell 110, and a linear polarization portion 120 is provided at a lower side of the liquid crystal cell 110.

Of course, similarly to the above-mentioned embodiment, a PDP, an OLED panel, or other various display panels, in addition to the LCD panel, may be used as the display panel 100.

In the display device including a capacitive type touch panel portion 300, a ratio of outdoor light incident from the outside to reflected light is described as follows.

First, about 4% of the outdoor light may be reflected from the uppermost cover film 350. Subsequently, about 0.1% of the transmitted light may be reflected from each of the three transparent conductive layers 311, 312, and 313, so that the reflected light may be emitted to outside in an amount corresponding to, in total, 0.3% of the transmitted light.

In addition, about 1.6% of the further transmitted light is reflected from each of a lower surface of the board 360 and an upper surface of the display panel 100, so that the reflected light is generated in an amount corresponding to, in total, 3.2% of the further transmitted light.

Accordingly, in the present embodiment, the reflected light may be generated in an amount corresponding to, in total, 7.5% of the outdoor light. An amount of this reflected light is greatly decreased, compared with a case where the first and second polarization conversion portions 201 and 202 are not applied. For example, an amount of reflected light reaches approximately 18% in a state where the first and second polarization conversion portions 201 and 202 are not applied.

Figure 8:
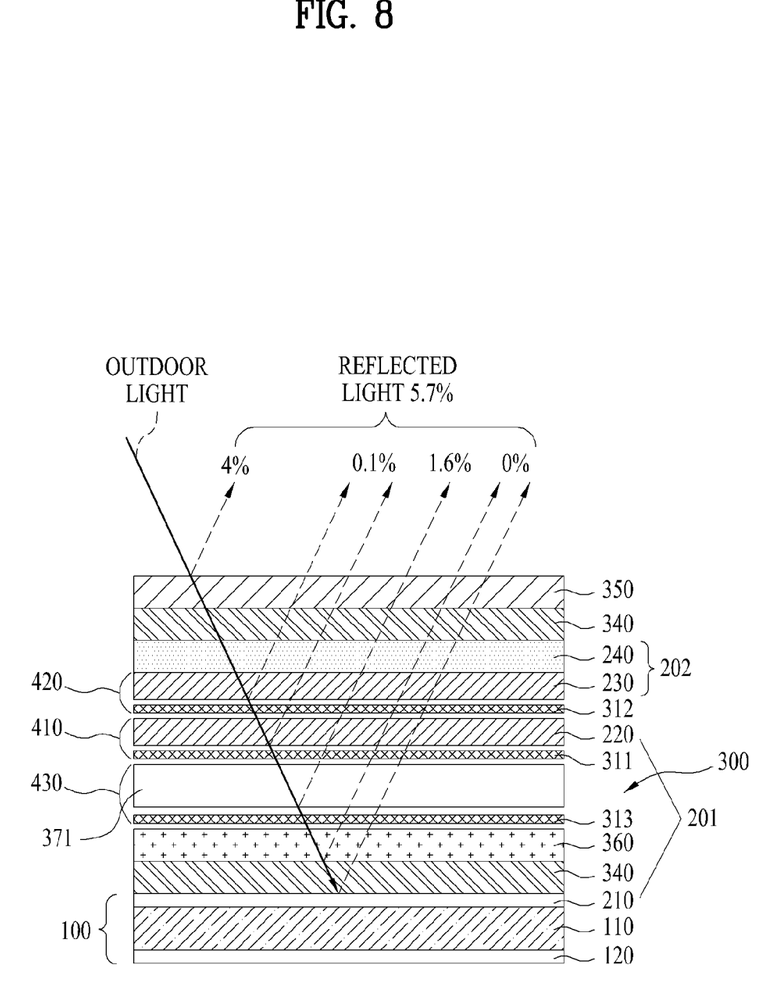
FIG. 8 is a sectional view illustrating a touch panel display device according to a third embodiment of the present invention.
Figure 9:
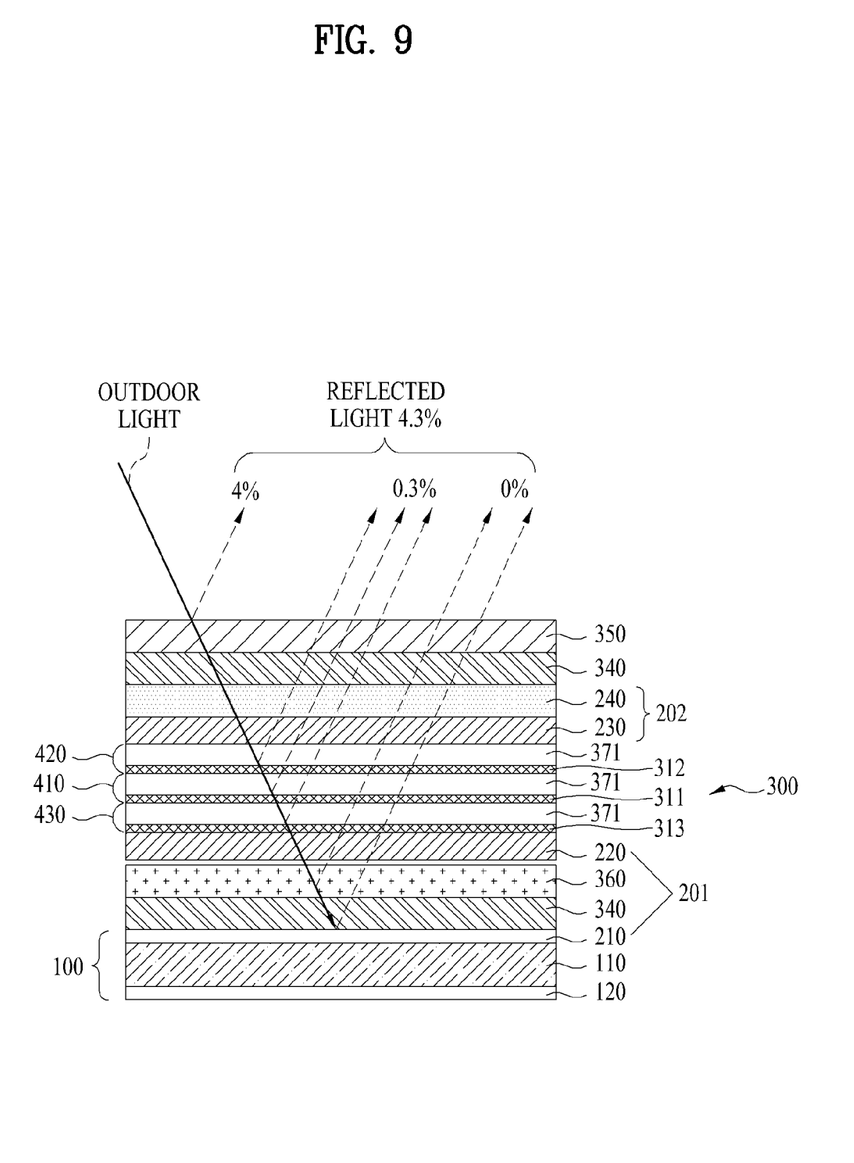
FIG. 9 is a sectional view illustrating a touch panel display device according to a fourth embodiment of the present invention.

FIGS. 8 and 9 illustrate a touch panel display device having an integral structure according to another embodiment, different from the structure described in FIGS. 1 and 7.

That is, a structure including a first polarization conversion portion 201 and a second polarization conversion portion 202 is located over a board 360, and the board 360 and a display panel 100 are attached to each other by a transparent bonding layer 340 so as to have an integral structure. Other structures are similar to the structures illustrated in FIGS. 1 and 7.

In the structure as illustrated in FIG. 8, since reflected light may not be generated at a lower surface of the board 360 and an upper surface of the display panel 100, the reflected light may be emitted to the outside in an amount corresponding to about 5.7% of the outdoor light, in which about 3.2% is decreased from total 8.9% of FIG. 1.

Furthermore, in the structure as illustrated in FIG. 9, reflected light may not be generated at a lower surface of the board 360 and an upper surface of the display panel 100. Accordingly, about 4% of the outdoor light may be reflected from an uppermost cover film 350, and about 0.3% of the transmitted light may be reflected from each of the three transparent conductive layers 311, 312, and 313. Hence, the reflected light may be emitted to outside in an amount corresponding to, in total, 4.3% of the outdoor light.

Meanwhile, in the embodiments as illustrated in FIGS. 7 to 9, operations to maximize transmittance in which light emitted from the display panel 100 is transmitted to the outside are similar to the above-mentioned embodiments.

As described above, when the touch screen is applied to a portable device such as a cellular phone or a portable multimedia player (PMP), reduction in reflectivity, reduction in power consumption due to improved transmittance, and improved visibility may be effectively maximized.

That is, it may be possible to overcome inconvenience in use caused by deterioration of visibility of the screen of the cellular phone due to indoor light or sunlight during operation outdoors. Also, it may be possible to greatly improve power problems caused by limitations of battery capacity.

Furthermore, there are limitations as to battery capacity in the portable device. Also, power consumption is gradually increased as many functions such as a camera are recently realized in the portable device such as the cellular phone. However, it may be possible to greatly increase battery life in the case according to the present embodiment.

Specific effects related to improvement in visibility may be identified through Ambient Contrast Ratio (ACR) data. There are two ACR standards, and each of the standards may be expressed as follows.

First, one of the ACR standards is a CIE 145 standard defined by Equation 1 below. Here, $L_w$ refers to a brightness value of full screen white, and $L_k$ refers to a brightness value of black in the darkroom.

$$ACR\ C = (L_W - L_K)/(L_W + (L_K/3))$$ [Equation 1]

ACR values are measured according to this standard. In the case of a display device including a general touch panel portion where the first and second polarization conversion portions 201 and 202 of each of the above-mentioned embodiments are not applied, $L_w$ is measured as 2319 nit and $L_k$ is measured as 1914 nit. Thus, in the case of Equation 1, an ACR value is measured as 0.136.

On the other hand, in the case of applying the first and second polarization conversion portions 201 and 202 described in the present embodiments, $L_w$ is measured as 506.3 nit and $L_k$ is measured as 90.73 nit. Thus, it may be seen that an ACR value is greatly increased to 0.774.

Also, the other one of the ACR standards is a NIST FPDM standard defined by Equation 2 below.

$$ACRC = \frac{\frac{\beta_W E_0}{\pi} + L_W}{\frac{\beta_K E_0}{\pi} + L_K}$$ [Equation 2]

Here, Ambient Contrast Ratio (ACR) C refers to a contrast value when ambient light is $E_0$, and $\beta_w$ and $\beta_K$ are equal to Equation 3 and Equation 4, respectively.

$$\beta_W = \pi(L_h - L_W)/E_h$$ [Equation 3]

$$\beta_K = \pi(L_d - L_K)/E_d$$ [Equation 4]

Here, $L_h$ and $L_d$ refer to brightness values of white and black of a flat panel display (FPD) device, respectively, and $E_h$ and $E_d$ refer to illumination values in the above-mentioned case, respectively.

Figure 10:
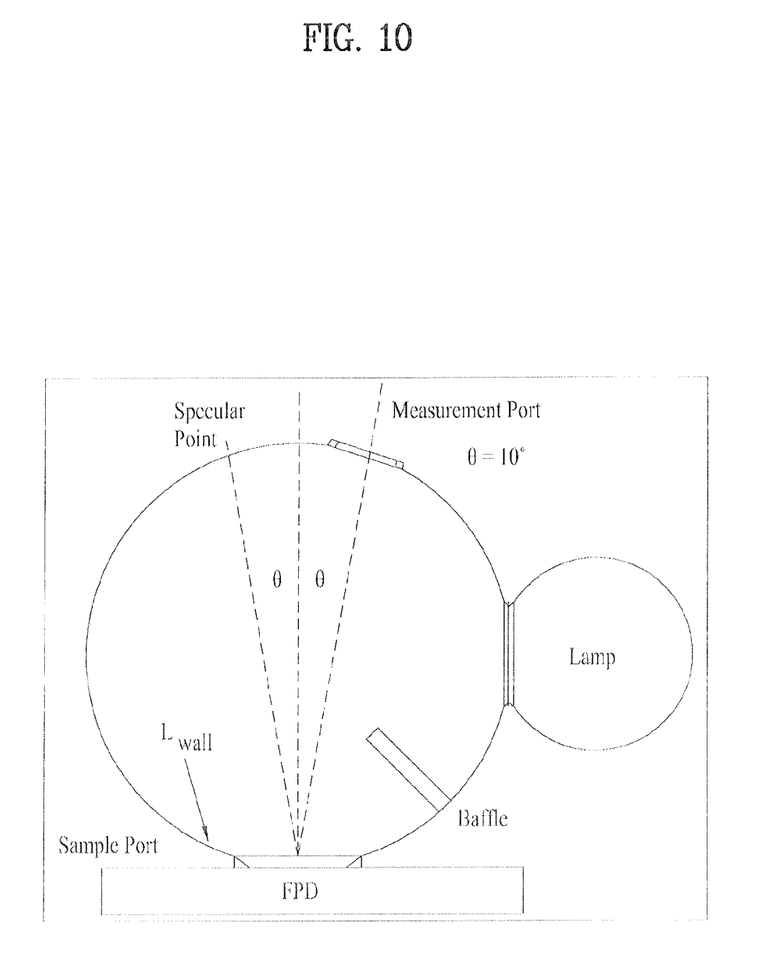
FIG. 10 is a view schematically illustrating a measurement environment of an ambient contrast ratio (ACR).

In detail, as shown in FIG. 10, a sphere is located on the FPD and a light source is located at one side of the sphere. An ACR value is measured on a measuring port of the sphere in the above-mentioned state.

In Equations 3 and 4 shown above, $L_h$ and $L_d$ refer to brightness values of white and black of the FPD device, which are measured at the measuring port of the sphere, respectively. Also, $E_h$ refers to $kL_{W-h}$ and $E_d$ refers to $kL_{W-d}$, where $L_{W-h}$ and $L_{W-d}$ refer to brightness values of white and black, which are measured at wall sides of the sphere, respectively.

ACR values are measured according to this standard. In the case of a display device including a general touch panel portion where the first and second polarization conversion portions 201 and 202 of each of the above-mentioned embodiments are not applied, when $L_w$ which is 2319 nit and $L_k$ which is 1914 nit are applied, an ACR C value is measured as 1.21.

On the other hand, in the case of applying the first and second polarization conversion portions 201 and 202 described in the present embodiments, when $L_w$ which is 506.3 nit and $L_k$ which is 90.73 nit are applied, it may be seen that an ACR C value is greatly increased to 5.58.

Therefore, when the ACR measurement values are considered, visibility may be improved by 4.6 to 5.6 times or more.

Accordingly, in accordance with the present invention, it may be seen that character and graphic recognition of a cellular phone display is improved outdoors. That is, in accordance with application of the structure according to the present invention, brightness of the display panel is maintained in the level equal to the previous brightness while an amount of light reflected from outdoor light is decreased to 8% or less. Thus, visibility may be improved by 4.6 to 5.6 times or more.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

In accordance with the configuration of a touch panel display device according to the present invention, reflectivity may be decreased and transmittance may be increased. Thus, when a touch screen is applied to a portable device such as a cellular phone or a portable multimedia player (PMP), reduction in power consumption and improved visibility may be effectively maximized.

That is, it may be possible to overcome inconvenience in use caused by deterioration of visibility of a screen of a cellular phone due to indoor light or sunlight during operation outdoors. Also, it may be possible to greatly improve power problems caused by limitations of battery capacity.

As a result, character and graphic recognition of a cellular phone display may be improved outdoors. That is, in accordance with application of the structure according to the present invention, brightness of the display panel is maintained in the level equal to the previous brightness while an amount of light reflected from outdoor light is decreased to 8% or less. Thus, visibility may be improved by 4.6 to 5.6 times or more.

The invention claimed is:

1. A touch panel display device comprising:
   a display panel;
   a first film layer arranged over the display panel, the first film layer comprising a first substrate, a first transparent conductive layer arranged under the first substrate and having a first pattern, and an index matching layer provided at a surface in which the first transparent conductive layer is not located;
   a second film layer arranged over the first film layer, the second film layer comprising a second substrate, a second transparent conductive layer arranged under the second substrate and having a second pattern, and an index matching layer provided at a surface in which the second transparent conductive layer is not located; and
   a touch window arranged over the second film layer,
   wherein the index matching layer allows at least one of reflectivity between the first substrate and the first transparent conductive layer and reflectivity between the second substrate and the second transparent conductive layer to be 1% or less.

2. The touch panel display device according to claim 1, further comprising a first polarization conversion portion arranged between the first transparent conductive layer and the display panel to convert light passing through the first polarization conversion portion into a first circularly polarized light state.

3. The touch panel display device according to claim 2, wherein the first polarization conversion portion comprises:
   a first linear polarization plate; and a first ¼ wavelength plate located over the first linear polarization plate.

4. The touch panel display device according to claim 3, wherein the first substrate is the first ¼ wavelength plate.

5. The touch panel display device according to claim 1, further comprising a second polarization conversion portion arranged between the second transparent conductive layer and the touch window to form light passing through the second polarization conversion portion in the form of a first circularly polarized light state.

6. The touch panel display device according to claim 5, wherein the second polarization conversion portion comprises:
a second ¼ wavelength plate; and
a second linear polarization plate located over the second ¼ wavelength plate.

7. The touch panel display device according to claim 6, wherein the second substrate is the second ¼ wavelength plate.

8. The touch panel display device according to claim 1, wherein at least one of the first and second substrates is an isotropic transparent film.

9. The touch panel display device according to claim 1, wherein the display panel is a liquid crystal display panel comprising a liquid crystal cell.

10. The touch panel display device according to claim 1, wherein at least one surface of the first and second substrates is further provided with a hard coating layer.

11. The touch panel display device according to claim 1, wherein the index matching layer comprises a higher refractive layer and a lower refractive layer.

12. The touch panel display device according to claim 11, wherein the higher refractive layer and the lower refractive layer are alternately disposed in the form of a plurality layers.

13. The touch panel display device according to claim 1, further comprising a third film layer comprising a third substrate and a third transparent conductive layer while being located between the display panel and the first film layer.

14. A touch panel display device comprising:
a display panel;
a first film layer arranged over the display panel, the first film layer comprising a first substrate, a first transparent conductive layer arranged under the first substrate and having a first line pattern, and an index matching layer arranged between lines of the first line pattern;
a second film layer arranged over the first film layer, the second film layer comprising a second substrate, a second transparent conductive layer arranged under the second substrate and having a second line pattern, and an index matching layer arranged between lines of the second line pattern;
a touch window arranged over the second film layer;
a first polarization conversion portion arranged between the first transparent conductive layer and the display panel to convert light passing through the first polarization conversion portion into a first circularly polarized light state; and
a second polarization conversion portion arranged between the second transparent conductive layer and the touch window to form light passing through the second polarization conversion portion in the form of a first circularly polarized light state.

15. The touch panel display device according to claim 14, wherein the first polarization conversion portion comprises:
a first linear polarization portion; and
a first ¼ wavelength plate located over the first linear polarization portion, and wherein the second polarization conversion portion comprises:
a second ¼ wavelength plate; and
a second linear polarization portion located over the second ¼ wavelength plate.

16. The touch panel display device according to claim 15, wherein the second linear polarization portion has an optical axis parallel with an optical axis of the first linear polarization portion.

17. The touch panel display device according to claim 15, wherein the second linear polarization portion has an optical axis perpendicular to that of the first linear polarization portion.

18. The touch panel display device according to claim 14, wherein the index matching layer has a function to compensate difference in index of refraction between the first substrate and the first transparent conductive layer and between the second substrate and the second transparent conductive layer.

19. The touch panel display device according to claim 14, wherein the index matching layer allows at least one of reflectivity between the first substrate and the first transparent conductive layer and reflectivity between the second substrate and the second transparent conductive layer to be 1% or less.

20. The touch panel display device according to claim 14, wherein the display panel is a liquid crystal display panel comprising a liquid crystal cell.

21. The touch panel display device according to claim 14, wherein at least one surface of the first and second substrates is further provided with a hard coating layer.

22. The touch panel display device according to claim 14, wherein the index matching layer comprises a higher refractive layer and a lower refractive layer.

23. A touch panel display device comprising:
a display panel;
a first polarization conversion portion arranged over the display panel to convert light passing through the first polarization conversion portion into a first circularly polarized light state;
a touch panel portion arranged over the first polarization conversion portion and comprising at least two transparent conductive layers, each of the transparent conductive layers has a pattern;
a second polarization conversion portion arranged over the touch panel portion to form light passing through the second polarization conversion portion in the form of a first circularly polarized light state; and
an index matching layer arranged between the respective patterns of the transparent conductive layers.

24. The touch panel display device according to claim 23, wherein the first polarization conversion portion comprises:
a first linear polarization portion located over the display panel; and
a first ¼ wavelength plate located over the first linear polarization portion.

25. The touch panel display device according to claim 23, wherein the second polarization conversion portion comprises:
a second ¼ wavelength plate located over the touch panel portion; and
a second linear polarization portion located over the second ¼ wavelength plate.

26. The touch panel display device according to claim 23, wherein the second linear polarization portion has an optical axis parallel with an optical axis of the first linear polarization portion.

27. The touch panel display device according to claim 23, wherein the second linear polarization portion has an optical axis perpendicular to that of the first linear polarization portion.

28. The touch panel display device according to claim 23, wherein the display panel is a liquid crystal display panel comprising a liquid crystal cell.

29. The touch panel display device according to claim 28, wherein the first linear polarization portion is included in the liquid crystal display panel.

30. The touch panel display device according to claim 28, wherein the liquid crystal display panel further comprises a lower polarization plate at a lower side of the liquid crystal cell.

31. The touch panel display device according to claim 23, wherein each of the transparent conductive layers is located over a ¼ wavelength plate included in the first or second polarization conversion portion or over a transparent film.

32. A touch panel display device comprising:
a liquid crystal display panel comprising a first linear polarization plate;
a first ¼ wavelength plate to convert light passing through the first ¼ wavelength plate into a first circularly polarized light state, while being operated together with the first linear polarization plate;
at least two transparent conductive layers each having a respective pattern arranged over the first ¼ wavelength plate and/or a transparent film while being spaced apart from each other;
a second polarization conversion portion arranged over each of the transparent conductive layer to form light passing through the second polarization conversion portion in the form of a first circularly polarized light state; and
an index matching layer arranged between the respective patterns of the transparent conductive layers.

33. A touch panel display device comprising:
a touch window;
a touch panel portion comprising at least two transparent conductive layers;
a second polarization conversion portion comprising a second ¼ wavelength plate and a second linear polarization portion, installed between the touch window and the touch panel portion;
a display portion arranged at a lower end of the touch panel portion;
a first polarization conversion portion comprising a first ¼ wavelength plate and a first linear polarization portion, installed between the touch panel portion and the display portion; and
an index matching layer arranged between the first ¼ wavelength plate or the second ¼ wavelength plate and one of the transparent conductive layers,
wherein the second linear polarization portion linearly polarizes light incident from the touch window onto the touch panel portion, and the second ¼ wavelength plate converts the light passing through the second linear polarization portion into circularly polarized light of a first direction.

34. The touch panel display device according to claim 33, wherein the second ¼ wavelength plate converts the light reflected from the transparent conductive layers into linearly polarized light.

35. The touch panel display device according to claim 33, wherein the second linear polarization portion has an optical axis parallel with an optical axis of the first linear polarization portion.

36. The touch panel display device according to claim 33, wherein the second linear polarization portion has an optical axis perpendicular to that of the first linear polarization portion.

* * * * *